Patented Jan. 17, 1950

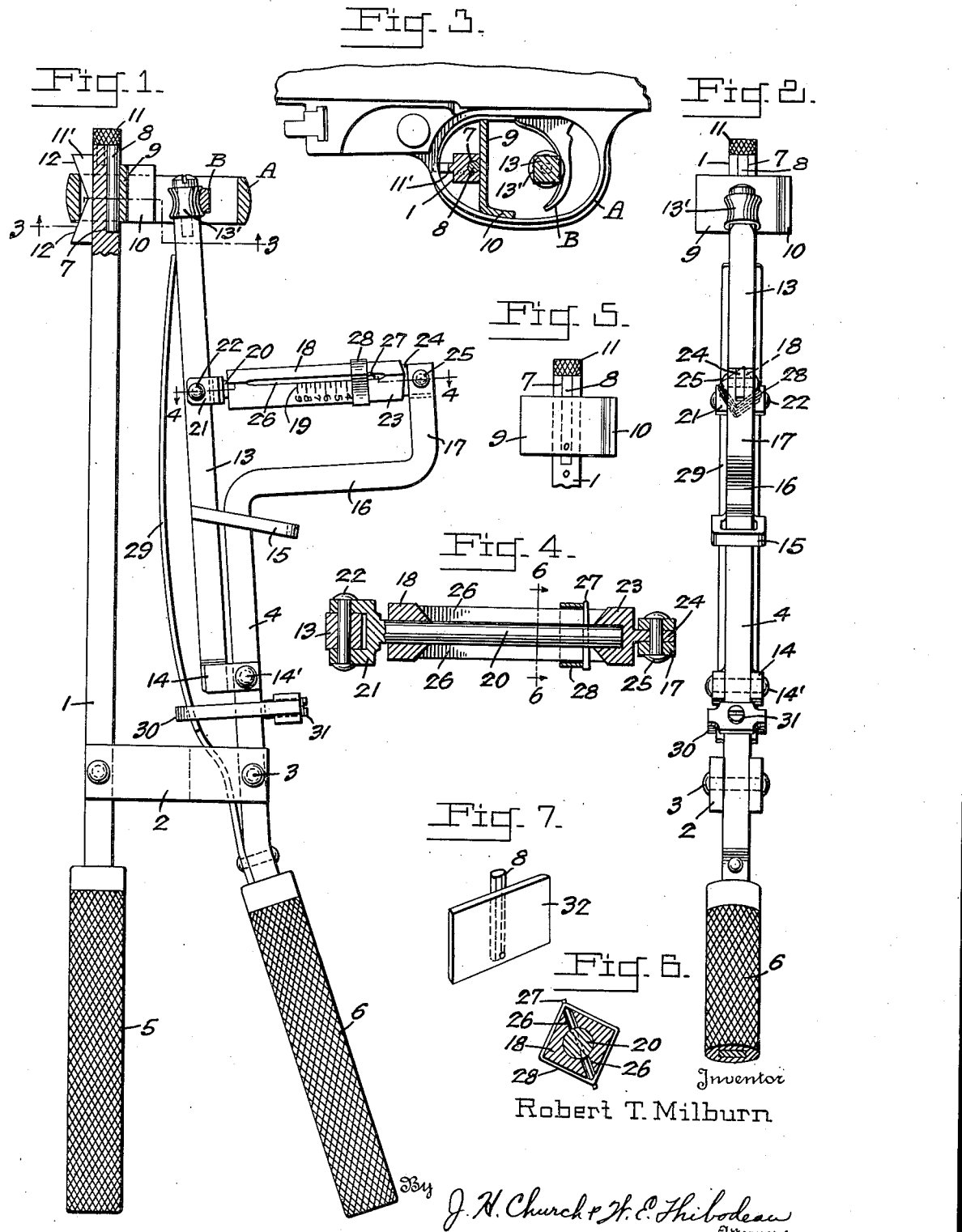

2,494,571

UNITED STATES PATENT OFFICE 2,494,571

TRIGGER PULL TESTER

Robert T. Milburn, New Orleans, La.

Application November 14, 1945, Serial No. 628,648

7 Claims. (Cl. 73—167)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a testing tool and more especially to a tool for testing the trigger pull of small arms, such as rifles, carbines, etc. Its principal object is to provide a handy, simple and durable device with which the pull of the trigger in pounds and fractions thereof may be easily, quickly and accurately ascertained, the extent of which is conveniently and visibly indicated during the operation of the tester and recorded at the end of the test.

It is important that the trigger pull of a particular type of gun be regulated to a nicety and that it be uniform in the particular type, that is to say, the pull will be the same in each gun so that the gunner will know that he can "squeeze" the trigger with a steady increase in pressure before the sear is released, or otherwise manipulate the trigger, as the exigencies of the case may require. Poor shooting is principally due to errors in the trigger squeeze. If the trigger pull is not accurately established, the likelihood of such errors is increased. In recognition of these conditions, the present invention contemplates the provision of a durable and economical device easily and conveniently operated with one hand, and one which when inserted in the trigger guard, with which it is designed to cooperate in the testing operation, will be practically automatically brought to proper position with respect to the trigger guard and trigger and stabilized in that position in such a manner as to assure an accurate test.

It is the practice to test the trigger pull of each individual weapon, operations that consume considerable time, and to expedite the work and save time and incidentally expense, is among the objects of this invention, which is accomplished in that it has been estimated that an accurate test by my method effects a saving of several minutes per gun, (with operators of average skill), as compared with the method heretofore practiced. The use of the tool simplifies testing and eliminates the use of weights and other materials weighing many pounds, made necessary by the testing methods heretofore practiced.

In the drawings illustrating the invention:

Figure 1 is a plan view of the tool complete and in the position in which it is held when being operated, the end of one arm being sectioned to show the manner in which the removable positioning plate is attached to the arm, there being shown in section a portion of a trigger and trigger guard.

Figure 2 is an edge view of the tool.

Figure 3 is a detail view showing the trigger guard and trigger of "U. S. Carbine 30 M1," with the operating ends of the tester in position therein, say in the beginning of the testing operation, the tool parts being sectioned about on the line 3—3 of Figure 1.

Figure 4 is an enlarged longitudinal section of the indicator body with indicator band operating rod therein, in elevation, on line 4—4 of Figure 1.

Figure 5 is a detail of a positioning plate on the end of one of the tool arms.

Figure 6 is a cross section of the indicator body on line 6—6 of Figure 4.

Figure 7 is a perspective view of a slightly modified positioning plate appropriate to the testing of the pull of a revolver trigger, similar to that shown in Figure 5, with the exception that the flange or foot of the plate is omitted.

Referring to the drawing A designates the trigger guard and B the trigger of a carbine.

The numeral 1 designates an arm to which near its rear end is rigidly secured a bracket 2 to the outer end of which is pivotally connected at 3, the arm 4. The arms have knurled handles 5 and 6 by which they and the parts carried thereby are moved to and from each other and adapted to be pressed toward each other in the testing operation, as will appear.

The arm 1 is provided with an elongated open end slot 7 for the reception of a pin 8 rigidly secured to a positioning plate 9 provided with a flange or foot 10 at right angles or substantially so, to the body of the plate. The outer end of the pin, when in the slot, is flush with the outer end of the arm and to hold the pin, and consequently the plate in proper position relative to the end of the arm, a knurled button 11 is provided and mounted eccentrically on the end of the arm and adapted to be rotated to one position to uncover the slot to permit the insertion of the pin, and to another to prevent its accidental dislodgment. The positions of these parts shown in Figure 1, are the pin holding positions.

On one side of the arm 1 opposite the positioning plate is a rigidly attached centering member 11' whose outer inwardly inclined edges 12 engage the trigger guard and center the tool, and aided by the foot 10 of the positioning plate 9, stabilized the tool in the guard during the testing operation and preparatory thereto.

The tool is completed by the following important mechanisms including an elongated finger 13 whose rear end is provided with a laterally extending bifurcated extension 14 pivoted at 14' to the arm 4, the bifurcations of the extension straddling the arm in close working contact. The front end of the finger carries roller 13' mounted on a headed pin threaded into the end of the arm. The roller is formed with a concave arcuate annular groove which receives the rounded front edge of the trigger in the testing operation. In advance of the extension 14 there is a yoke 15 through which the arm 4 extends and by which its movement is guided and limited. Forwardly, and just beyond the yoke 15 the arm 4 is bent sharply at right angles forming a lateral arm portion 16 of considerable length which terminates in an arm portion 17 substantially parallel with the finger 13. Between the end of the portion 17 and the finger 13 the indicator means is located. This comprises an elongated member 18, preferably square in cross section so as to present a flat side upon which the pressure indicating calibrations 19 may be placed to facilitate quick and convenient reading in a line substantially at right angles to the line of sight of the operator. The member 18 has a bore therethrough for the passage of a rod 20 reciprocable in the member and provided at one end with a bifurcated head 21 whose bifurcations straddle the finger 13, there being a pin 22 pivotally attaching the head to the finger. The other end 23 of the member 18 is formed with an ear 24 received in the bifurcated end of the arm portion 17 of the arm 4, to which it is pivotally attached by a pivot pin 25. At diagonally opposite corners of the member 18 it is provided with long narrow slots 26 through which protrude the ends of a pin 27 which passes through the rod 20 and is arranged to engage the edge of an indicating band 28 which slides on said member with a frictional fit that assures its remaining at the point on the scale at which the pin leaves it at the end of the test, thus visually recording the trigger pull.

Rigidly secured to the arm 4 near the handle is the rear end of a bowed flat spring 29 whose front end extends nearly to the front end of the finger 13 against which it bears and resists the separation of the arm 4 from the finger 13 during the testing operation.

The tool is completed by a slotted spring-tensioning band 30 which embraces the spring and the arm 4, there being an adjusting screw 31 in the enlarged outer end of the band with its inner end in engagement with the arm so that the tension of the spring may be varied according to the requirements of the tool.

In Figure 3 there is shown a trigger guard and trigger of the shape used upon a carbine and showing the arm 1 and its positioning plate 9 in its testing position with the plate spanning the space between the upper and lower edges of the guard, and the foot resting on the lower inner portion of the guard, with the centering member 11' against the inner front portion of the guard. With these parts in the position described the roller 13' on the finger 13 will be in engagement with the rounded front edge of the trigger. It will be understood that the positioning plates which are structurally substantially the same, will differ slightly in size accordingly as the size and shape of the trigger guard may vary. They are all provided integrally with pin 8 to fit in the slot 7 in the arm 1, but the foot of some of them may be omitted, as for instance in the case with the positioning plate 32 for a pistol, as shown in Figure 7.

*Operation.*—When the tool is not being used the arms 1 and 4 with the parts carried thereby move freely and unrestrainedly with relation to each other, the arm 4 pivoting on the pivot 3, there being no movement of the rod 20 in the indicating member, and consequently no movement of the indicating band relative to the scale. To test a trigger pull, the operating ends of the arms 1 and 4 are inserted in the trigger guard A with the centering plate 11' against the inner front portion of the guard and the positioning plate 9 engaging the upper inner portion of the guard with its foot 10 on the lower inner portion of the guard, as shown in Figure 3, with the roller on the finger 13 against the front edge of the trigger. The handles are now pressed slowly together when the abutment formed by the trigger guard and the resistance of the trigger, brings about action of the spring 29 against the pressure of which the arm 4 is rocked on its pivot 14', drawing the body 18 outwardly causing the transverse pin 27 to move the indicator band on the scale, denoting the resistance of the trigger in pounds and fractions of pounds, before and at the time of the release of the sear. The indicator band stays at the point on the scale where it was left by the pin 27 at the end of the test, and for the next operation it must be manually restored to its furthermost outward position.

It will be understood that the tool will be accurately tested by well known methods and that the calibrations will be spaced accordingly to the end that the trigger pull will be accurately measured in pounds and fractions thereof.

Obviously, the positioning plates are of importance since they stabilize the working ends of the arm 1 and finger 13 in the trigger guard during the test and contribute to the accuracy of the test. It will be seen, however, even if they were omitted the tool can still be advantageously employed using the inner front portion of the trigger guard as an abutment, with the roller on the finger 13 in engagement with the front edge of the trigger.

I claim:

1. A tool for testing the trigger pull of guns, comprising, two spaced arms mounted as first class levers for movement to and from each other, one of which is adapted to be inserted between the gun trigger and an abutment in advance of the trigger, means carried by the operating end of said one arm for centering the arm relative to the trigger, a member pivotally connected to the other arm and lying between the two arms and adapted to engage the front of the trigger, spring means biasing said member toward said other arm, and indicating means interposed between said member and said other arm and responsive to the pressure exerted upon the trigger by said member upon the separation of the two arms against the pressure of said spring means.

2. A tool for testing the trigger pull of guns, comprising two spaced arms mounted as first class levers for movement to and from each other, one of which is adapted to be inserted between the gun trigger and an abutment in advance of the trigger, means carried by the operating end of the said one arm for centering the arm relative to the trigger, an elongated finger pivotally connected to the other arm and lying between the two arms and adapted to engage the front of the trigger, spring means biasing said finger toward said other arm, and indicating means interposed between said finger and said other arm and responsive to the pressure exerted upon the trigger by said finger upon the separation of the two arms against the pressure of said spring means.

3. A tool for testing the trigger pull of gun triggers protected by a trigger guard, comprising two spaced arms mounted as first class levers for movement to and from each other, manually operable means for imparting such movement to the arms, one arm being provided at its operating end with means adapted to engage the front inner portion of the trigger guard to center the arm in the guard and also with means adapted to engage the trigger guard to position and stabilize the arm in operative position relative to the trigger, an elongated finger pivotally connected to the other arm, and lying between the two arms, and whose operating end is adapted to engage the front of the trigger in the testing operation, spring means biasing the finger toward said other arm, and indicator means carried partly by the finger and partly by the other arm and responsive to the pressure applied to the trigger upon separation of the arms, against the pressure of said spring.

4. The invention of claim 3, characterized in that the positioning and stabilizing means is removably mounted on its arm, there being means for locking said positioning and stabilizing means on said arm.

5. The invention of claim 3, characterized in that the positioning and stabilizing means comprises a plate having a pin rigidly attached thereto, the arm being provided with an elongated open end slot receiving said pin whereby said positioning and stabilizing means is removably mounted on said arm.

6. The invention of claim 3, characterized in that the centering means comprises a flat member rigidly secured to the outer end of the arm and formed with a V-shaped recess whose edges are adapted to engage the front portion of the trigger guard.

7. A tool for testing the trigger pull of a trigger protected by a trigger guard, comprising two arms mounted as first class levers for movement to and from each other, means carried by the operating end of one arm adapted to engage the trigger guard for centering and positioning the tool relative to the trigger, an elongated finger lying between the two arms and pivotally connected with the other arm and provided on its operating end with an anti-friction roller adapted to engage the front of the trigger, a spring secured to said other arm and in engagement with said finger and biasing it toward said other arm, indicator means interposed between said finger and said other arm comprising an elongated body having an elongated slot in its wall, a rod pivotally connected with the finger and reciprocable in said body, a movable marker frictionally embracing said body and slidable thereon, a pin carried by the rod and extending through the slot into engagement with the marker to move said marker on the body when the body is moved outwardly relative to the finger in the testing operation, and suitable quantity indicating calibrations on said body cooperating with the marker to indicate the pressure said finger is subjected to in the testing operation.

ROBERT T. MILBURN.

REFERENCES CITED

The following references are of record in the file of this patent:

UNITED STATES PATENTS

| Number | Name | Date |
|---|---|---|
| 1,647,287 | Floyd | Nov. 1, 1927 |
| 2,385,052 | Birk et al. | Sept. 18, 1945 |
| 2,406,386 | Koepnick et al. | Aug. 27, 1946 |

FOREIGN PATENTS

| Number | Country | Date |
|---|---|---|
| 4,158 | Switzerland | Nov. 22, 1891 |
| 258,902 | Germany | Apr. 21, 1913 |